United States Patent
Schierling et al.

Patent Number: 5,533,815
Date of Patent: Jul. 9, 1996

[54] BEARING ARRANGEMENT FOR A DEVICE COMPRISING TWO ROTATING COMPONENTS

[75] Inventors: Bernhard Schierling, Kürnach; Hilmar Göbel, Grafenrheinfeld; Cora Carlson, Hambach, all of Germany

[73] Assignee: Fichtel & Sachs AG, Schweinfurt, Germany

[21] Appl. No.: 109,364

[22] Filed: Aug. 19, 1993

[30] Foreign Application Priority Data

Aug. 20, 1992 [DE] Germany .............. 42 27 533.4
Aug. 12, 1993 [DE] Germany .............. 43 27 079.4

[51] Int. Cl.⁶ .................................................. F16F 15/30
[52] U.S. Cl. ............... 384/482; 192/70.17; 192/70.12; 192/207
[58] Field of Search ............................. 384/482, 481; 192/70.17, 70.12, 106.2

[56] References Cited

U.S. PATENT DOCUMENTS

| | | | |
|---|---|---|---|
| 4,727,970 | 3/1988 | Reik et al. | 192/70.17 |
| 4,760,905 | 8/1988 | Göb | 192/58 B |
| 4,854,751 | 8/1989 | Grassmuck et al. | |

FOREIGN PATENT DOCUMENTS

| | | |
|---|---|---|
| 2573826 | 5/1986 | France . |
| 8412116 | 8/1984 | Germany . |
| 3442679 | 4/1989 | Germany . |
| 822397 | 10/1959 | United Kingdom . |
| 1471236 | 4/1977 | United Kingdom . |
| 2234021 | 1/1991 | United Kingdom . |

*Primary Examiner*—Lenard A. Footland
*Attorney, Agent, or Firm*—Brumbaugh, Graves, Donohue & Raymond

[57] ABSTRACT

For a dual-mass flywheel in the driving train of a motor vehicle there is proposed a cage-free ball-bearing 9 which has solid balls and is therefore particularly narrow in the axial direction and is sealed in a lubricant-tight manner by a sealing and insulating ring arrangement 31 formed by two ring elements 27, 29. The ring elements 27, 29 are tightly connected to one another axially beyond the ball-bearing 9 and rest with inherent elasticity under bias on the lateral faces of the ball-bearing 9.

28 Claims, 4 Drawing Sheets

BEARING ARRANGEMENT FOR A DEVICE COMPRISING TWO ROTATING COMPONENTS

BACKGROUND OF THE INVENTION

The invention relates to a bearing arrangement for a device comprising a first component which is rotatingly driven round an axis of rotation and a second component which is rotatable relative to the first component at least over a limited angle of rotation round the axis of rotation and rotatingly drivingly connected to the first component. In particular, the invention relates to a bearing arrangement for a dual-mass flywheel with a first flywheel which forms the first component and a second flywheel which is torsionally elastically connected to the first flywheel via torsional damping means and forms the second component.

A rotatingly driven component, such as a shaft or the like, is usually rotatably mounted on a stationary component, a machine base or a housing, for example, by means of a rolling bearing. The rolling bearing has a gap between its inner race and its outer race through which dirt may penetrate into the bearing or into the housing or lubricant may escape from the bearing or housing. Conventional bearings are therefore sealed by sealing rings, at least on the outside.

In the above-described bearing arrangement, only the inner race which guides the shaft rotates, whereas the outer race is stationary. The peripheral speed at which the rolling members of the bearing rotate is comparatively low. Consequently, the fluid pressure to which the sealing rings are subjected is also comparatively low. In a plurality of applications, however, in particular in the field of automotive engineering, both components which are mounted on one another rotate not only relative to one another but also jointly round an axis of rotation. Lubricant contained in the bearing is thus subjected to centrifugal forces which make increased demands on the seal. One example for a device with two-components which rotate both jointly and relative to one another is a dual-mass flywheel which is arranged in the path of the driving torque of the internal combustion engine of a motor vehicle, wherein a first flywheel connected to the crankshaft and a second flywheel rotatably mounted relative to the first flywheel via the bearing arrangement are torsionally elastically connected by means of a torsional vibration damper. Further examples of such devices are fluid friction clutches for driving radiator fans or gear transmission arrangements rotating as a unit for driving auxiliary units of an internal combustion engine, such as those known from U.S. Pat. No. 4,760,905 or British Application 2 234 021 (U.S. Pat. No. 5,147,254).

German Patent 34 42 679 discloses a dual-mass flywheel with two flywheels which are rotatable relative to one another round a common axis of rotation and are torsionally elastically connected to one another via a torsional vibration damper. Whereas a first one of the two flywheels is fastened on the crankshaft of an internal combustion engine of a motor vehicle, a second of the flywheels carries a friction clutch of which it forms the opposing contact plate. The second flywheel is mounted on a bearing attachment of the first flywheel via a ball-bearing. The ball-bearing is sealed from the exterior in a lubricant-tight manner and is thermally insulated from the second flywheel by a sealing and insulating ring arrangement. The sealing and insulating ring arrangement comprises two rings which are substantially L-shaped in cross-section and of which each one engages with an axial ring arm between the outer race of the ball-bearing and a bearing seat formed by the second flywheel and has a radial ring arm. The radial ring arms rest on the lateral faces of the inner race of the ball-bearing and are tensioned against its lateral face by a respective Belleville spring washer. However, such a construction is fairly complicated and demands a relatively large amount of space.

SUMMARY OF THE INVENTION

It is an object of the invention to provide a bearing arrangement for a device comprising two components which rotate both jointly and relative to one another which is simpler and more compact than hitherto and permits operationally reliable sealing. In particular, it is an object of the invention to provide a bearing arrangement of this type which is suitable for mounting two flywheels of a dual-mass flywheel which are torsionally elastically connected to one another via torsional damping means.

The invention generally relates to a bearing arrangement for a device comprising a first component which is rotatingly driven round an axis of rotation and a second component which is rotatable relative to the first component at least over a limited angle of rotation round the axis of rotation and is rotatingly drivingly connected to the first component, and in particular to a dual-mass flywheel comprising a first flywheel which forms the first component and a second flywheel which is torsionally elastically connected to the first flywheel via torsional damping means and forms the second component.

A bearing arrangement according to the invention for use in a device of this type comprises:

- an inner bearing seat operationally fixedly connected to one of the two components, in particular the first component, an outer bearing seat coaxial with the inner bearing seat and operationally fixedly connected to the other of the two components,
- a rolling bearing which is arranged radially between the bearing seats and guides the components radially and in particular also axially on one another, the rolling bearing comprising an inner bearing race guided on the inner bearing seat, an outer bearing race guided on the outer bearing seat and a plurality of rolling members designed, in particular, as balls radially between the bearing races, and
- an annularly closed sealing ring arrangement, in particular in the form of a sealing and insulating ring arrangement, with a central ring region which is arranged radially between a first one of the two bearing races and a first one of the two bearing seats which guides the first bearing race, in particular between the outer bearing race and the outer bearing seat, and with ring arms which are arranged axially on both sides of the rolling bearing, project radially from the central ring region and of which each one rests both stationarily on a lateral face of the first bearing race and in a sliding manner on a lateral face of a second of the two bearing races, in particular the inner bearing race.

According to the invention, the rolling bearing is designed freely from a cage guiding the rolling members on one another and is peripherally substantially completely filled with rolling members between the two bearing races and the central ring region of the sealing ring arrangement connects the two radial ring arms to one another in a sealing manner.

Owing to the above-mentioned design, it is possible to design the rolling bearing axially very compactly so that it barely has to be wider than the rolling members, for example barely wider than the diameter of the balls. A ball-bearing of this type completely filled with balls may have, for assembly, a sprung outer bearing race, i.e. a bearing race provided with a parting line. Used in a dual-mass flywheel the sealing ring arrangement which seals the second flywheel carrying the clutch simultaneously seals the bearing thermally. This prevents lubricant from penetrating externally axially from the gap between the two bearing races and radially from the parting line of the sprung outer race. It will be appreciated that other embodiments of rolling bearings with a completely filled row of rolling bearings may be used, for example those having no sprung outer race.

The sealing ring arrangement may be shaped integrally in one part but preferably consists of two separate ring parts which are sealed from one another by an additional sealing ring. Each of these two ring parts may have, in addition to its radial ring arm, a ring arm which is angled axially from the radial ring arm. The two axial ring arms end in the central ring region, in particular in the centre of the rolling bearing, and are spaced apart slightly, the resultant gap being bridged by an elastic sealing ring resting tightly at least on the arm edges of the axial ring arms. The seal may be installed particularly simply by means of such an elastic sealing ring.

It may be advantageous to undercut the arm edges of the axial ring arms on the bevel through to the first bearing race, in particular to the outer bearing race and to arrange the sealing ring between the two bevels and the external diameter of the outer race. Such a design is not critical, in particular with respect to the tolerance of the individual components.

Alternatively, however, it is also possible to flatten the two arm edges of the axial ring arms to the bearing seat formed by the second flywheel by bevels and to fix the sealing ring between the two bevels and the bearing seat. In this way, the sealing ring itself comes to rest on an uninterrupted diameter even in the case of a sprung outer race. However, the sealing ring may also be arranged in a groove in the bearing seat from which it partially projects radially and extends to the two bevels. An arrangement of this type allows pre-installation of the sealing ring in the groove of the bearing seat.

In the above-described variations, the sealing ring seals between the arm edges of the axial ring arms and the face of either the bearing seat or the bearing race. To reduce the number of sealing face pairings it is proposed in a preferred embodiment that the sealing ring arrangement comprise two ring parts, of which each of the two ring parts has one of the radial ring arms and of which at least one of the two ring parts, in particular both ring parts, however, have an axial ring arm to form the central ring region; that the ring parts have axially spaced apart and axially opposed lateral faces axially within the central ring region which define an annular gap, in particular an annular gap located approximately axially in the centre of the central ring region; that the annular gap is bridged by an elastic sealing ring which rests on the lateral faces and is arranged axially between the lateral faces; and that annular shovel-shaped projections which project toward one another from the radially inner edges of the lateral faces, the projections having radially outer peripheral faces which taper radially toward the opposite shovel-shaped projection and reach below the sealing ring radially inwardly. A sealing ring of this type substantially seals only between the axially opposed lateral faces. Installation is comparatively easy since the sealing ring is loose or, optionally, biased and, depending on installation, is placed on the inner bearing seat or the outer bearing race and, when being installed, is raised between the lateral faces by the shovel-shaped projections. The sealing ring which, when mounted, is preferably radially spaced apart from the radially adjacent peripheral faces of the bearing seat and bearing race is thus, on its part, not subjected to direct heat contact with these components, which is of advantage to the service life of the sealing ring.

To allow the sealing ring to be safely raised between the lateral faces of the two ring parts, the shovel-shaped projections taper at least approximately to annular cutting edges. If the sealing ring is arranged between the outer bearing race and the outer bearing seat, the shovel-shaped projections end expediently closely adjacent to the outer race.

The annular gap which forms between the axially opposed lateral faces of the ring parts is preferably narrower in a radial direction radially inwardly of the sealing ring than radially outwardly of the sealing ring. In this way, sufficient reception capacity remains in the annular gap for the material volume of the sealing ring which elastically yields during installation of the sealing ring arrangement.

To make it possible to keep the sealing ring radially defined even under the influence of centrifugal forces, annular grooves which are immediately adjacent to the shovel-shaped projections radially are cut axially into the lateral faces of the ring parts, with which annular grooves the sealing ring engages axially. The annular grooves and the radially outer peripheral faces of the shovel-shaped projections lying adjacent to the annular grooves are preferably sector-shaped in cross-section.

In a variation, the two axial ring arms of the two ring parts of the sealing ring arrangement may preferably overlap one another radially in the centre of the bearing seat and thus form a seal. An embodiment in which ring tabs of reduced material thickness are shaped on the axial ring arms, a first ring tab resting on the bearing seat and a second ring tab resting in a sealing manner under inherent tension on the first ring tab, is particularly advantageous. The first ring tab preferably rests radially outwardly on the outer bearing seat whereas the second ring tab presses from radially internally, as such an arrangement is free from centrifugal forces.

In a further variation, the two ring parts of the sealing ring arrangement are connected tightly to one another, in particular welded tightly to one another, along a peripheral seam prior to installation of the rolling bearing. Ultrasonic welding is a tried-and-tested method.

The apparatus may be arranged such that the two ring parts of the sealing ring arrangement are placed on the rolling bearing before the welding process so that they rest with their weld regions against one another and leave a gap between the radial ring arms and the lateral faces of the first bearing race, for example the outer bearing race. During the welding process, the two ring parts are then axially loaded and brought to rest on the lateral faces of the first bearing race. In this way, axial play between the first bearing race and the two ring parts may be reduced and the radial ring arm resting on the lateral faces of the second (inner) bearing race may be axially biased. The bias of the radial ring arms may be intentionally controlled by the dimensioning of the axial excess of the two ring parts existing before the welding process and this is advantageous for the value of the basic friction of the torsional damper device.

In the last-mentioned embodiments, one of the two ring parts of the sealing ring arrangement may be L-shaped in cross-section and may have an axial ring arm as such forming the central ring region while the other of the two ring parts consists only of the radial ring arm. However, it is also possible for both ring parts to be L-shaped in cross-section so that both axial ring arms form the central ring region of the sealing ring arrangement. In the last-mentioned variation, the two axial ring arms are rigidly connected, in particular welded to one another, in the region of mutually adjacent arm edges.

To establish exactly defined contact between the radial ring arms and the lateral faces of the second (inner) bearing race it is proposed that the region of contact of each radial ring arm be provided with a bead. A safety gap is therefore automatically formed between the radial ring arm and the remaining regions of the bearing race.

A particularly narrow version may be achieved in that the two bearing races have the same axial range and the axial range is only slightly greater than the axial dimension of the rolling bearings, for example only slightly greater than the diameter of the balls.

In all the above-mentioned embodiments, the first bearing seat preferably comprises shoulders which extend axially toward one another axially on both sides of the first bearing race and bias the ring arms against the lateral face of the first bearing race. What is achieved in this way is not only axial fixing of the rolling bearing relative to the first bearing seat, but the force necessary for tensioning the sealing ring is produced in the case of embodiments which have an additional sealing ring.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
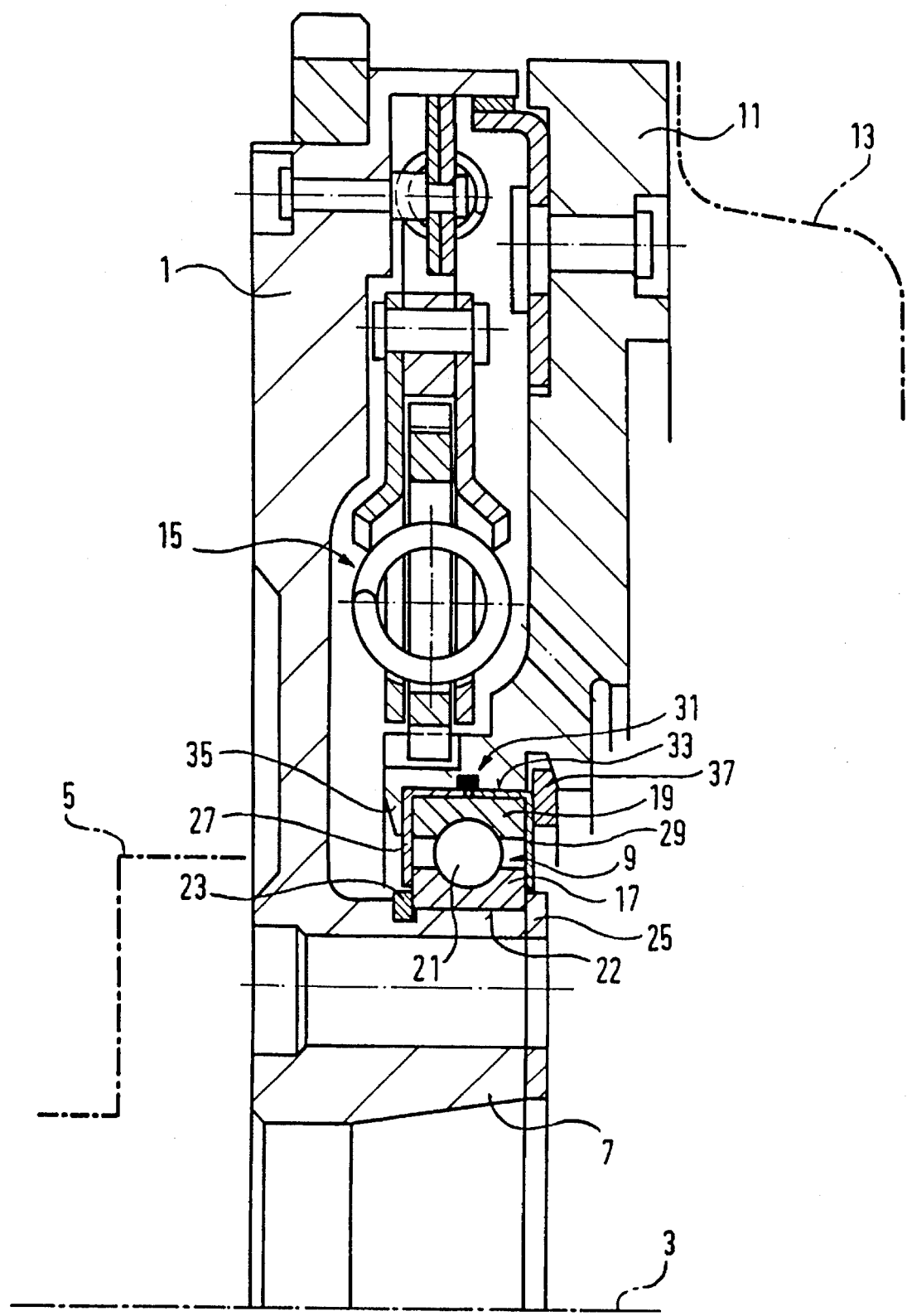
FIG. 1 is an axial longitudinal section through half of a dual-mass flywheel.

FIG. 1 shows substantially schematically a dual-mass flywheel with a first flywheel 1 which forms a primary centrifugal mass and may be fastened centrally relative to an axis of rotation 3 of a crankshaft indicated at 5 of a motor vehicle internal combustion engine. A secondary centrifugal mass in the form of a second flywheel 11 is mounted equi-axially rotatably relative to the first flywheel 1 by means of a rolling bearing 9 on a bearing attachment 7 fastened together with the flywheel 1 on the crankshaft 5. The second flywheel 11 carries a friction clutch which is indicated at 13 and is torsionally elastically connected to the first flywheel 1 via a torsional vibration damper 15. The torsional vibration damper 15 transmits the driving torque of the internal combustion engine from the first flywheel 1 onto the second flywheel 11 and filters torsional vibrations. It may optionally be sealed from the exterior and contain a lubricant filling.

The rolling bearing 9 is a cage-free ball-bearing which is filled substantially completely with balls 21 between its inner bearing race 17 and its outer bearing race 19. To enable the balls 21 to be inserted, the outer race is sprung in design, i.e. is provided with a parting line. As shown most clearly in FIG. 2, the inner bearing race 17 of the ball-bearing 9 is placed on a cylindrical seat 22 of the bearing attachment 7 and is secured axially by a tension ring 23 and a cover 25 of the bearing attachment 7. The second flywheel 11 is placed onto the outer race 19 with interposition of two ring parts or ring elements 27, 29 of a sealing and insulating ring arrangement 31 with a seat face 33 which is also cylindrical. A shoulder 35 as well as a cover ring 37 axially fix the flywheel 11 guided radially on the outer race 19 via the sealing and insulating ring arrangement 31.

Figure 2:
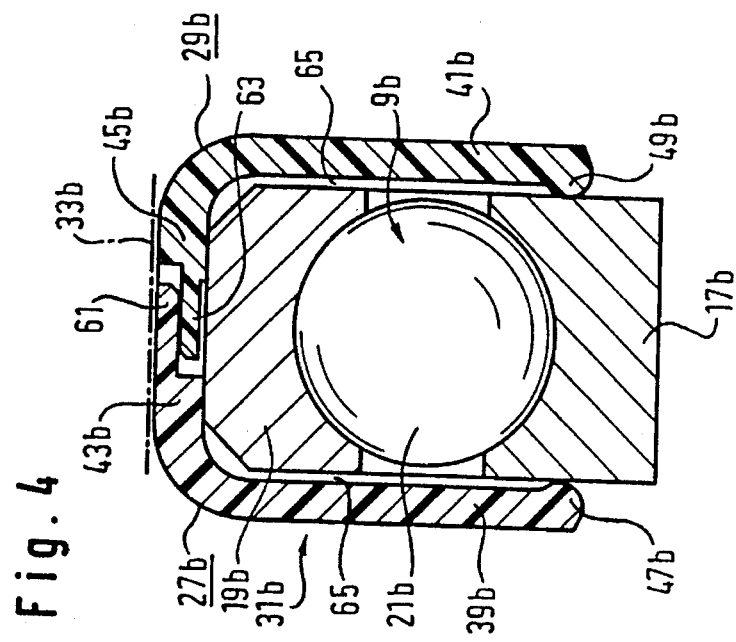
FIG. 2 shows a detail of the bearing region of the dual-mass flywheel sealed with a sealing and insulating ring arrangement.

FIG. 2 shows a section from the region of the ball-bearing 9 and details of the sealing and insulating ring arrangement 31. Each of the two ring elements 27, 29 has an L-shaped cross-section with a radial ring arm 39 or 41 and an axial ring arm 43 or 45. The radial ring arms 39, 41 project radially inwardly and each open in a bead 47 or 49 which rests with axial bias on one of the axial lateral faces of the inner bearing race 17. The two ring elements 27, 29 are fixed axially to the lateral faces of the outer bearing race 19 by the shoulders 35 and the ring cover 37 in the installed state corresponding to FIG. 2 so that the radial ring arms 39, 41 rest in a sealing manner on the lateral faces of the inner bearing race 17 with slight axial bias owing to the beads 47, 49. The two axial ring arms 43, 45 project toward one another from the radial ring arms 39, 41 but do not touch one another with their arm edges, so that an annular gap 51, though small, remains. Starting from the gap 51, the arm edges of the axial ring arms 43, 45 are provided with bevels 53, 55 which extend radially outwardly away from one another. Radially opposite the bevels 53, 55 an annular groove 57 is provided in the seat face 33, an elastic sealing ring 59 surrounding the ball-bearing 9 being arranged in the annular groove 57. The sealing ring 59 which may be inserted into the groove 57 in advance for installation projects radially inwardly beyond the seat face 33 at least before installation and, after installation, bridges in a sealing manner the two bevels 53, 55 which are axially tensioned toward one another. This ensures that lubricant present in the interior of the ball-bearing 9 cannot escape radially outwardly, for example through the sprung outer race 19. The seal via the beads 47, 49 of the radial ring arms 39, 41 relative to the lateral faces of the inner bearing race 17 is provided axially toward the side and radially inwardly.

As also shown in FIG. 2, the inner bearing race 17 and the outer bearing race 19 are axially substantially equal in width and only slightly wider than the diameter of the balls 21. As the ring elements 27, 29 seal the ball-bearing 9 owing to their inherent elasticity and a guide cage for the balls 21 is dispensed with owing to the substantially complete ball filling of the bearing, the overall axial depth of the bearing arrangement is very small. Nevertheless, the ball-bearing 9 may be permanently sealed and insulated thermally against the effect of heat, in particular by the second flywheel 11 stressed by frictional heat. The ring elements 27, 29 are preferably composed of plastics material.

Variations of sealing and insulating ring arrangements for the dual-mass flywheel in FIG. 1 are illustrated hereinafter. Identically acting components are designated with the reference numerals from FIGS. 1 and 2 and are provided with a letter for distinction. Reference is made to the description of the preceding figures for explanation of design and mode of operation.

Figure 3:
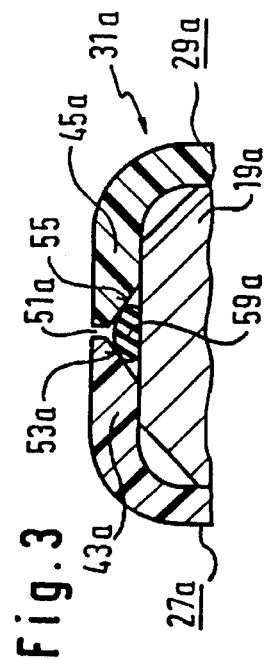
FIGS. 3 to 9 show details of variations of the bearing region with associated sealing and insulating ring arrangement.

FIG. 3 shows a variation of sealing and insulating ring arrangement 31a in which the two axial ring arms 43a and 45a have, on their axially adjacent arm edges, bevels 53a, 55a which widen radially inwardly toward the outer race 19a starting from the annular gap 51a. The sealing ring 59a is fixed between the two bevels 53a, 55a and the outer periphery of the outer race 19a and again bridges the gap 51a.

Figure 4:
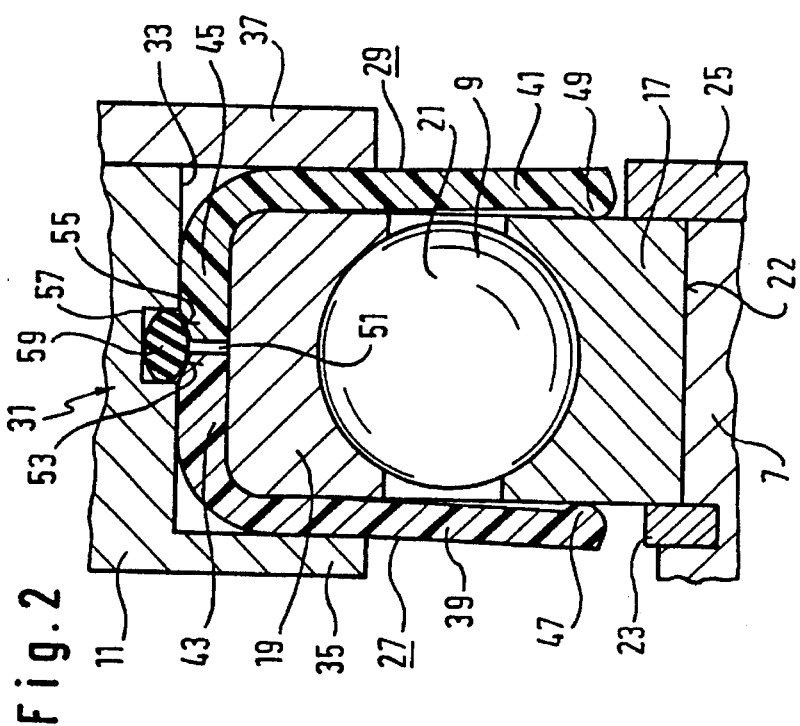

FIG. 4 shows a further variation of a sealing and an insulating ring arrangement 31b in conjunction with a ball-bearing 9b of the above-described type. The illustration shows the conditions before installation into the dual-mass flywheel. The axial ring arms 43b, 45b are provided with ring tabs 61, 63 of reduced material thickness which overlap axially. In the installed state, the ring tab 61 of the ring part 27b rests on the seat face of the second flywheel indicated at 33b and forms an annular gap radially inwardly into which the tab 63 of the other ring part 29b penetrates.

The tab 63 is shaped such that it is under radially outwardly directed bias in the installed state and therefore rests on the ring tab 61 in a sealing manner. For this purpose, the tab 63 is cleared radially inwardly toward the external diameter of the outer race 19b. This arrangement is simple to install and, owing to the contact between the tab 61 and the bearing seat 33b, is free from centrifugal forces. The illustration in FIG. 4 shows the state in which the ring parts 27b, 29b on the ball-bearing 9b are merely pre-installed, the radial ring arms 39b, 41b still extending parallel to the lateral faces of the bearing races 17b, 19b and, in particular, still forming gaps 65 relative to the lateral faces of the outer bearing race 19b. After installation of the ball-bearing 9b into the second flywheel, the gaps 65 are reduced and the radial arms 39b, 41b rest under axial bias with the beads 47b, 49b on the lateral faces on the inner bearing race 17b.

FIGS. 5 to 8 show further variations of the sealing of a cage-free ball-bearing of a dual-mass flywheel by means of a sealing and insulating ring arrangement. The sealing and. insulating ring arrangement preferably consists of plastics material, as in the previously described variations, but in this case of a plastics material which may be intentionally and locally heated by an ultrasonic welding process such that a homogeneous welded joint may be produced between separately prefabricated ring elements of the arrangement.

Figure 5:
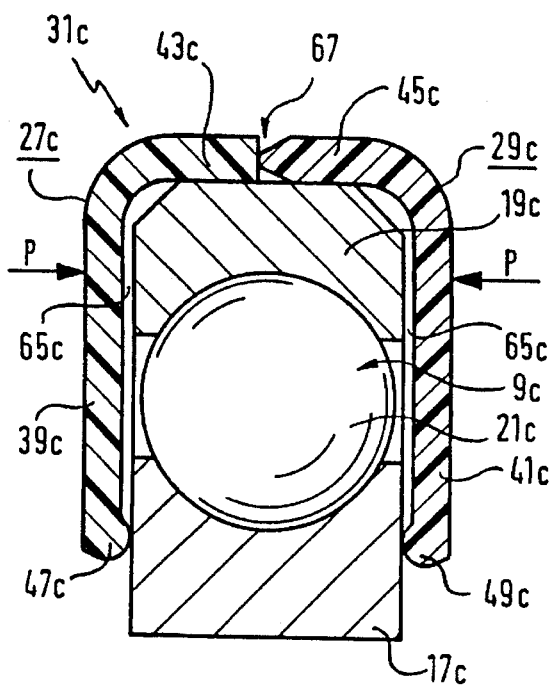
Figure 6:
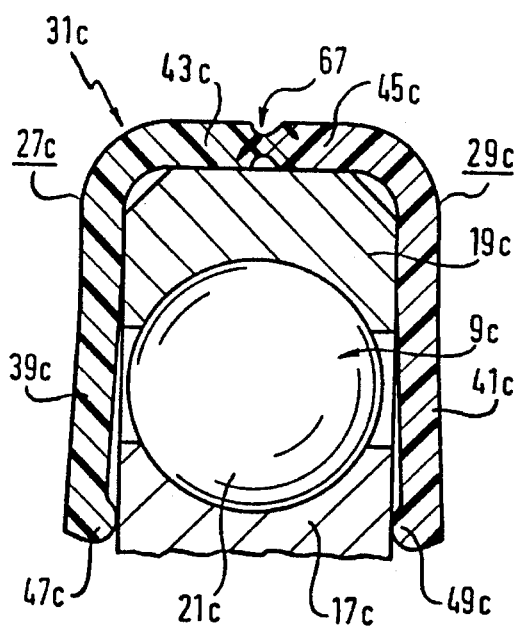

FIGS. 5 and 6 show a ball-bearing 9c in two successive stages of pre-installation of a sealing and insulating ring arrangement 31c. The sealing and insulating ring arrangement 31c again comprises two ring elements 27c, 29c with a respective radial ring arm 39c or 41c and a respective axial ring arm 43c or 45c. The ring elements 27c, 29c are dimensioned such that, according to FIG. 5 in a state pre-installed on the ball-bearing 9c, the arm edges, defining a weld region 67, of the two axial ring arms 43c, 45c rest on one another when the two radial ring arms 39c, 41c rest with their beads 47c, 49c just on the lateral faces of the inner bearing race 17c. In this pre-installed state the radial ring arms 39c, 41c extend at a distance from the lateral faces of the outer bearing race 19c so as to form gaps 65c. The weld region 67 is preferably designed such that one of the two axial ring arms, the ring arm 31c in this case, has a radially extending end face whereas the arm edge of the other axial ring arm 45c is conical in cross-section, i.e. tapers and rests with a smaller area on the first-mentioned axial ring arm 43c. During the welding process, an axial force is exerted on the two ring elements 27c, 29c in the region of the outer bearing race 19c along the arrows P so that a configuration according to FIG. 6 is formed after the welding process in which the weld region 67 connects the two axial ring arms 43c, 45c homogeneously and peripherally tightly and the radial ring arms 39c, 41c are simultaneously placed without clearance on the outer bearing race 19c. The radial ring arms 39c, 41c are elastically deformed during this process and are axially biased in their radially inner region so that the beads 47c, 49c rest in a sealing manner on the lateral faces of the inner bearing race 17c. The ball-bearing 9c pre-installed in this manner with the two welded ring elements 27c, 29c can then first be inserted into the bearing seat 33 of the second flywheel 11 (FIG. 1) and may then be placed and axially fixed on the bearing attachment 7 of the first flywheel 1 together with the second flywheel 11.

Figure 7:
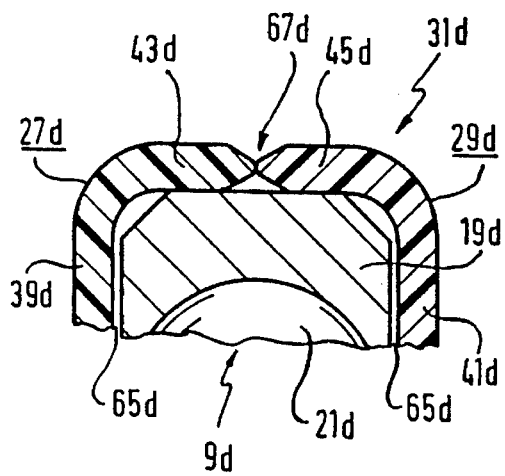

FIG. 7 shows a variation of the embodiment in FIG. 6 in the pre-installed state of FIG. 5. The two ring elements 27d, 29d of the sealing and insulating ring arrangement 31d are identical in design, the arm edges of the two axial ring arms 43d, 45d being bevelled radially inwardly and/or radially outwardly so that the arm edges form peripheral contact faces of which the material cross-section is smaller than the regions of the axial ring arms 43d, 45d adjacent to the material cross-section. The identical design of the ring elements 27d, 29d reduces the production costs and rules out confusion between the two ring elements 27d, 29d. Installation is carried out according to FIGS. 5 and 6.

In the above-described embodiments, the two ring elements of the sealing and insulating ring arrangement placed onto the ball-bearing from axially opposed sides are sealed from one another substantially in the centre of the central ring region of this arrangement.

Figure 8:
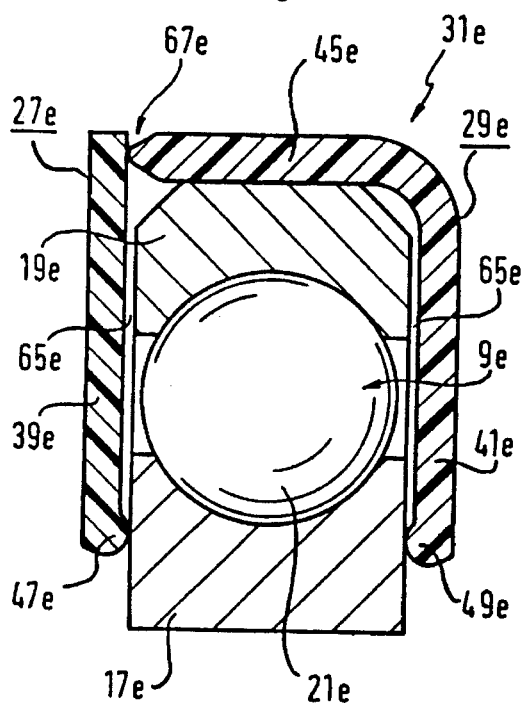

FIG. 8 shows a variation in which the sealing region is offset axially into the region of a lateral face of the ball-bearing 9e. Whereas one of the two ring elements, the ring element 27e in this case, is designed as a substantially plane radially extending disc 39e, the other ring element 29e is L-shaped in cross-section and has an axial ring arm 45e extending over the entire width of the ball-bearing 9e. The disc 39e as well as the radial ring arm 41e have annular beads 47e and 49e for providing a seal relative to the lateral faces of the inner bearing ring 17e. The arm edge of the axial ring arm 45c is again tapered and, in the weld region 67e, rests on one lateral face of the disc 39e.

FIG. 8 shows the pre-installed state of the sealing and insulating ring arrangement 31e in which the disc 39e and the radial ring arm 41e extend parallel to one another and form gaps 65e relative to the lateral faces of the outer bearing race 19e. The welding process takes place as in the description of FIGS. 5 and 6 with axial fixing so that the gaps 65e disappear and the sealing beads 47e, 49e rest with axial bias on the lateral faces of the inner bearing race 17e. The ball-bearing 9e is then installed on the dual-mass flywheel with the ring elements 27e, 29e which are tightly welded to one another.

Figure 9:
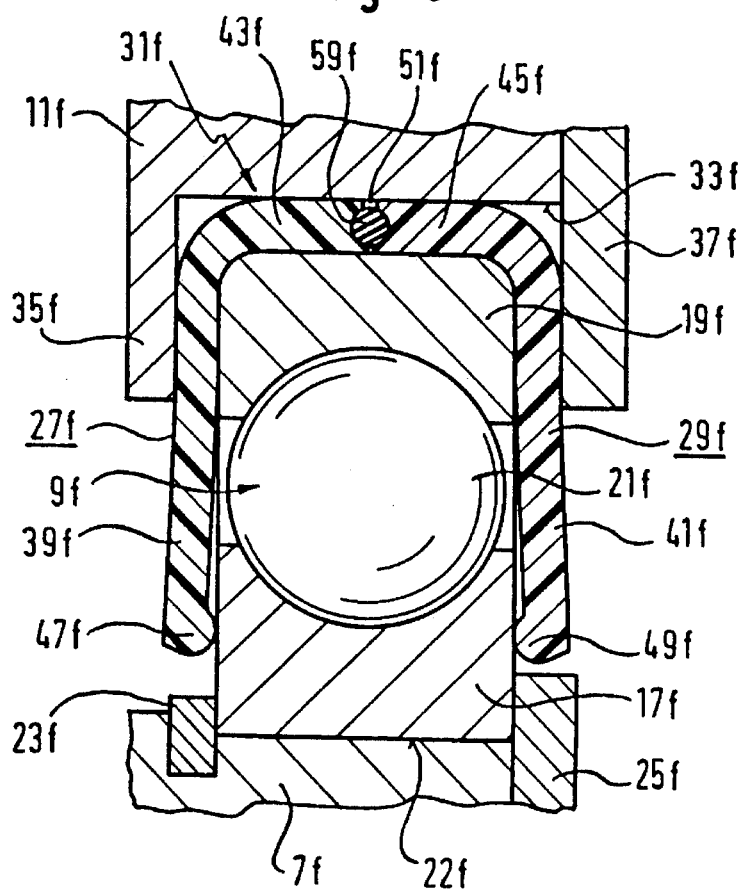

FIG. 9 shows a further variation in a state installed on the dual-mass flywheel of FIG. 1. The sealing and insulating ring arrangement 31f again comprises two ring parts 27f, 29f which, with radially extending ring arms 39f, 41f, are pressed tightly against the axial lateral faces of the outer bearing race 19f by the ring shoulders 35f, 37f of the second flywheel 11f, while annular beads 47f, 49f provided on the radially inner edges of the radial ring arms 39f, 41f rest in a sliding manner on the axial lateral faces of the inner bearing race 17f, being pressed on owing to their inherent elasticity. The two ring parts 37f, 29f have axial ring arms 43f, 45f which extend axially toward one another and reach between the outer bearing race 19f and its seat face 43f, the ring arms fixing an elastic sealing ring 59f between the axial lateral faces of their arm edges which lie axially opposed to one another substantially in the centre of the ball-bearing 9f.

Figure 10:
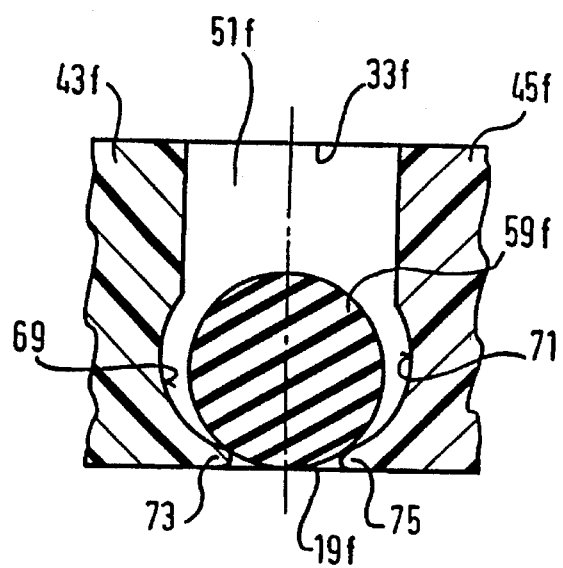
FIGS. 10 and 11 show a rough outline of the bearing of FIG. 9 for describing its installation.
Figure 11:
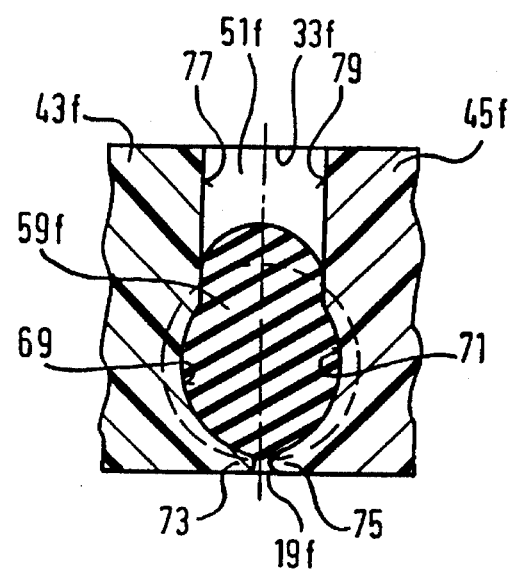

The axial lateral faces of the axial arms 43f, 45f which form the annular gap 51f have annular grooves 69, 71 which are sector-shaped in cross-section, as best shown in FIGS. 10 and 11, the annular grooves being immediately joined by annular shovel-shaped projections 73, 75 in the region of the radially inner edge of the lateral faces. The shovel-shaped projections 73, 75 terminate closely adjacent to the outer periphery of the outer race 19f in annular cutting edges toward which the annular sector face of the annular grooves 69, 71 which is sector-shaped in cross-section tapers.

FIG. 10 shows the pre-installed state of the sealing and insulating arrangement 31f in which the sealing ring 59f is placed on the outer race 19f. During installation of the bearing 9f, according to FIG. 9, the radial ring arms 39f, 41f are tensioned against the lateral faces of the outer race 19f, with the shovel-shaped projections 73, 75 reaching below the sealing ring 59f radially inwardly and raising it from the outer periphery of the outer race 19f. As shown in FIG. 11, the shovel-shaped projections 73, 75 largely approach one another in a finally assembled state without touching axially, however. On the side lying radially outwardly of the sealing ring 59f, the regions 77, 79 of the lateral faces forming the annular gap 51f, which regions lie adjacent to the annular grooves 69, 71, are at a comparatively great axial distance from one another and in this case define a space for receiving the ring material which is elastically displaced when the sealing ring 59f is tensioned axially. The distance between the annular grooves 69, 71 and the bearing seat 33f is greater radially outwardly than the distance between the annular grooves 69, 71 and the outer race 19f radially inwardly. In any case, however, the sealing ring 59f is kept at a distance from the peripheral faces of these parts such that the sealing ring is in sealing contact merely with the edge faces of the axial ring arms 43f, 45f. This improves the sealing effect and reduces thermal stress on the sealing ring 59f.

The above-described embodiments have the common feature that they allow an axially particularly narrow bearing which is still radially and axially sealed and simultaneously allow thermal insulation of the bearing. The design of the sealing and insulating ring arrangement also allows the radial ring arms to be intentionally axially fixed so that the basic friction of the torsional virbation damper of the dual-mass flywheel can be intentionally adapted at least to a certain extent.

In the above-described embodiments, the second flywheel carrying the clutch is placed onto the outer race of the ball-bearing. It will be appreciated that installation can optionally also be carried out in reverse, the second flywheel being guided on the inner bearing race of the ball-bearing. The axial ring arms of the sealing and insulating ring arrangement overlap the internal face of the inner bearing race. Other cage-free ball-bearings which are completely filled with rolling members, for example roller bearings or needle bearings, may be used instead of a ball-bearing.

The above-described embodiments of the bearing arrangement can also be employed in other devices than a dual-mass flywheel. They are advantageous in devices in which both components rotate both jointly and relative to one another round a common axis of rotation such that lubricating fluid or the like contained in the rolling bearing is to an increased extent subjected to centrifugal forces.

Bearing arrangements of this type may be employed in fluid friction clutches, for example, for driving a radiator fan, for instance, or in power take-off gear transmissions rotating as a whole, such as those used in motor vehicles for driving auxiliary units, like a generator, an air conditioner, an oil-pump or the like.

While specific embodiments of the invention have been shown and described in detail to illustrate the application of the inventive principles, it will be understood that the invention may be embodied otherwise without departing from such principles.

What we claim is:

1. A dual-mass flywheel comprising a first flywheel rotatable about an axis of rotation, a second flywheel rotatable relative to the first flywheel over a limited angle of rotation around the axis of rotation, torsional damping means elastically connecting the first flywheel to the second flywheel, and a bearing assembly between the first and second flywheels, the bearing assembly having:

an inner bearing seat operationally fixedly connected to one of the flywheels, an outer bearing seat coaxial with the inner bearing seat and operationally fixedly connected to the other of the two flywheels, a cageless ball bearing arranged radially between the inner and outer bearing seats and guiding the flywheels radially and axially in relation to each other, said bearing having a circumferentially continuous inner bearing race guided on the inner bearing seat, an outer bearing race split radially along a parting line and guided on the outer bearing seat and a plurality of balls substantially filling circumferentially the space between the bearing races, and an annularly closed sealing and insulating ring arrangement including a central ring region arranged radially between the outer bearing race and the outer bearing seat and ring arms that are arranged axially on both sides of the ball bearing to project radially from the central ring region and of which each one rests stationarily on a respective lateral face of the outer bearing race and in a sliding manner on a respective lateral face of the inner bearing race, the sealing and insulating ring arrangement being formed of two parts having an annular juncture located radially outwardly of the outer bearing race, and the sealing and insulating ring arrangement further including sealing means for sealing the juncture and including one of an elastic sealing ring, overlapping sealing faces on the two parts, and a circumferentially continuous sealing seam formed between the two parts by plastic deformation of at least one of the parts.

2. A dual-mass flywheel according to claim 1, wherein each of the ring parts has one of the radial ring arms and an axial ring arm portion, the axial ring arm portions project axially toward one another from the radial ring arms to form the central ring region and define at the juncture an annular gap between axially adjacent arm edges, the annular gap being bridged by an elastic sealing ring resting tightly on parts of the axial ring arm portions adjacent the annular gap.

3. A dual-mass flywheel according to claim 2 wherein the annular gap is located approximately axially in the center of the central ring region.

4. A dual-mass flywheel according to claim 2 wherein the arm edges have internal bevels extending obliquely away from one another toward the outer bearing race and wherein the sealing ring is fixed between the bevels and an outer peripheral face of the outer bearing race facing the bevels.

5. A dual-mass flywheel according to claim 2, wherein the arm edges radially on the side of the outer bearing seat have bevels extending obliquely away from one another toward the second flywheel and wherein the sealing ring is fixed between the bevels and the outer bearing seat.

6. A dual-mass flywheel according to claim 5, wherein the outer bearing seat contains a peripheral groove in which the sealing ring partially engages.

7. A dual-mass flywheel according to claim 1, wherein each of the two ring parts has one of the radial ring arms and at least one of the two ring parts has an axial ring arm forming the central ring region, wherein the ring parts have axially opposed and axially spaced apart lateral faces axially within the central ring region forming the annular juncture, said lateral faces defining an annular gap at said juncture, wherein the annular gap is bridged by an elastic sealing ring which rests on the lateral faces and is arranged axially between the lateral faces, and wherein annular shovel-shaped projections project toward one another from the radially inner edges of the lateral faces, said projections having radially outer peripheral faces which taper radially toward the opposite shovel-shaped projection and extend below the sealing ring radially inwardly.

8. A dual-mass flywheel according to claim 7 wherein both ring parts have an axial ring arm forming the central ring region.

9. A dual-mass flywheel according to claim 7 wherein the annular gap is located approximately axially in the center of the central ring region.

10. A dual-mass flywheel according to claim 7, wherein the shovel-shaped projections taper at least approximately to annular sharp edges.

11. A dual-mass flywheel according to claim 7, wherein the sealing ring is spaced apart radially both from the outer bearing seat and from the outer bearing race.

12. A dual-mass flywheel according to claim 7, wherein the annular gap is narrower in an axial direction radially inwardly of the sealing ring than radially outwardly of the sealing ring.

13. A dual-mass flywheel according to claim 7, wherein annular grooves lying immediately adjacent to the shovel-shaped projections radially are cut in axially into the lateral faces of the ring parts, said annular grooves being engaged axially by the sealing ring.

14. A dual-mass flywheel according to claim 13, wherein the annular grooves and the radially outer peripheral faces of the shovel-shaped projections lying adjacent to the annular grooves are sector-shaped in cross-section.

15. A dual-mass flywheel according to claim 13, wherein the annular grooves guide the sealing ring radially between the outer bearing seat and the outer bearing race in such a way that the radial projection of the annular gap is larger on the radially outer side of the sealing ring than on the radially inner side.

16. A dual-mass flywheel according to claim 7, wherein the sealing ring is arranged between the outer bearing race and the outer bearing seat and the shovel-shaped projections end closely adjacent to the outer bearing race.

17. A dual-mass flywheel according to claim 1, wherein each of the two ring parts has one of the radial ring arms and an axial ring arm, wherein the axial ring arms project axially toward one another from the radial ring arms to form the central ring region and, over a portion of their axial extent at the juncture, overlap axially and rest radially elastically on one another.

18. A dual-mass flywheel according to claim 17, wherein a first one of the two ring parts has, in the overlapping region, a ring tab of reduced material thickness resting on the outer bearing seat of the outer bearing race and a second one of the two ring parts has a ring tab which is installed with a bias directed radially outwardly to the outer bearing seat.

19. A dual-mass flywheel according to claim 18, wherein an aperture is formed on the side, located radially towards the outer bearing race, of the ring tab of the second ring part.

20. A dual-mass flywheel according to claim 1, wherein each of the ring parts has one of the radial ring arms and an axial ring arm, wherein the axial ring arms project axially toward one another from the radial ring arms to form the central ring region and, over a portion of their axial extent at the juncture, which juncture is located substantially in the axial center of the central ring region, overlap axially and rest radially elastically on one another.

21. A dual-mass flywheel according to claim 1, wherein the two ring parts are rigidly connected to one another along a peripheral sealing seam at the annular juncture.

22. A dual-mass flywheel according to claim 21, wherein the two ring parts are welded to one another at the juncture in a material region forming the central ring region, with plastic deformation and axial shortening of this material region.

23. A dual-mass flywheel according to claim 21, wherein a first one of the two ring parts has an axial ring arm substantially completely forming the central ring region and a second of the two ring parts consists substantially only of the radial ring arm.

24. A dual-mass flywheel according to claim 21, wherein the two ring parts have axial ring arms which project axially toward one another from the radial ring arms and are welded at the juncture to one another along their mutually adjacent arm edges.

25. A dual-mass flywheel according to claim 1, wherein each of the radial ring arms has an annular bead resting on a respective lateral face of the inner bearing race.

26. A dual-mass flywheel according to claim 1, wherein each of the two radial ring arms rest with radial bias solely owing to the inherent material elasticity of the sealing ring arrangement on a respective lateral face of the inner bearing race.

27. A dual-mass flywheel according to claim 1, wherein the inner bearing race and the outer bearing race have approximately equal axial dimensions which are only slightly greater than the diameter of the balls.

28. A dual-mass flywheel according to claim 1, wherein the outer bearing seat has shoulders directed axially toward one another axially on both sides of the outer bearing race, said shoulders engaging the radial ring arms against the lateral faces of the outer bearing race.

* * * * *